United States Patent [19]

Poerink

[11] 3,915,025

[45] Oct. 28, 1975

[54] LINK-TYPE CONVEYOR BELT

[76] Inventor: Jannes Jonge Poerink, 25 Prins Bernardlaan, Borne, Netherlands

[22] Filed: Apr. 22, 1974

[21] Appl. No.: 463,090

[30] Foreign Application Priority Data

Apr. 25, 1973 Germany............................ 2320921

[52] U.S. Cl.............. 74/245 C; 74/250 C; 198/189
[51] Int. Cl.²................... F16G 13/02; B65G 17/00
[58] Field of Search.......... 74/245 C, 250 C, 245 R, 74/250 R; 99/443 C; 198/189

[56] References Cited

UNITED STATES PATENTS

| | | | |
|---|---|---|---|
| 203,476 | 5/1878 | Mey................................. | 74/245 C |

FOREIGN PATENTS OR APPLICATIONS

| | | | |
|---|---|---|---|
| 24,435 | 6/1915 | United Kingdom................ | 74/425 R |
| 474,203 | 2/1915 | France.............................. | 74/250 R |
| 1,064,570 | 5/1954 | France.............................. | 74/250 R |

*Primary Examiner*—Leonard H. Gerin
*Attorney, Agent, or Firm*—Burgess, Dinklage & Sprung

[57] ABSTRACT

A link conveyor belt is disclosed and is made up of a plurality of interconnected links each having legs in a double H configuration, which links provide a flat supporting surface. The free ends of the double H links are longitudinally aligned and have transversely extending aligned heads with transverse bores. Adjacent heads of the links define a space into which the heads of another double H link are rotatably inserted. The double H links are positioned one behind the other in staggered relation with rods inserted through the aligned transverse bores of the head of at least two staggered links. The rod can be shorter than the width of the belt and retainer pins can be inserted transversely through the bores of each head positioned at the edge of the belt so as to prevent axial movement of the rod itself.

5 Claims, 6 Drawing Figures

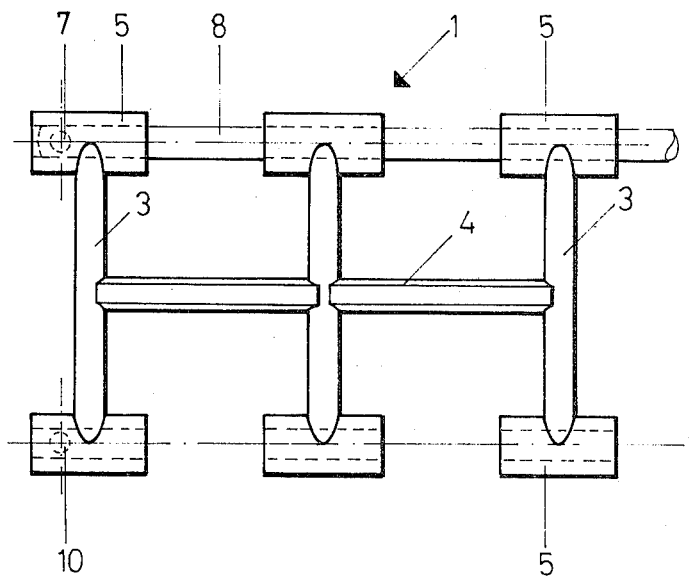
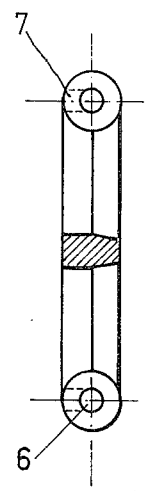
Fig. 2  Fig. 3
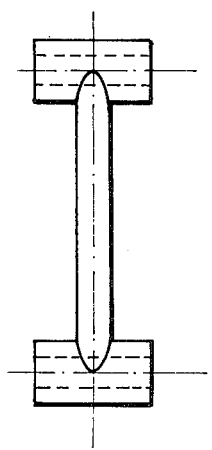
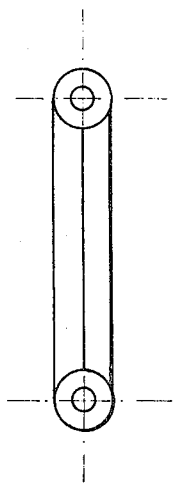
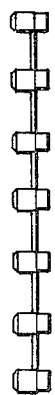
Fig. 4  Fig. 5  Fig. 6

LINK-TYPE CONVEYOR BELT

The present invention relates to a link conveyor belt comprising a plurality of interlinked links of plastic material.

Conveyor belts of this type are employed in conveying tracks of various kind, for example for the transportation of freshly baked bread. The links are of such a configuration that they can be easily cleaned and exchanged. Besides, these links should be of such construction that no portion of the individual links is torn out even at higher tensile loads.

A link conveyor belt of this type is known from applicant's German patent application No. 2,049,129 laid open to public inspection Although the conveyor belt described in this publication has proved its usefulness in practice, in many applications, however, it is desirable to provide a more open structure and an increased free space through which waste substances may fall and through which cooling air may be blown. Furthermore, the conveyor belt should be adapted to be tied or linked in a particularly easy manner.

A link conveyor belt fulfilling the abovementioned objects is characterized by links consisting of an $n$-fold series ($n = 1, 2, 3 \ldots$) of legs disposed in H configuration and having attached to the free ends thereof transversely extending heads provided with bores which heads between the opposite sides of the bores define a space into which the heads of another link are rotatably inserted, whereby an axle rod is inserted through a series of heads of at least two links positioned one behind the other in staggered relation.

In addition to the single H configuration, it is possible to provide a double H (HH) or a triple H configuration (HHH) or the like. A double H configuration has proved to be of particular advantage for the desired articulation and ease of assembling. Advantageously, the webs or legs are flat on their lower faces, and they taper in their cross-section towards the planely disposed supporting surface. This construction is of particular advantage as a great supporting surface reduces the friction wear; on the other hand, the legs should be particularly narrow at their upper faces such that a minimum surface area for the adherence of contaminations is formed.

In order to fix the axle rod, it is suggested to provide one retainer pin each on at least two heads at the edges, which pins hold between them the axle rod such that the latter may rotate relative to the link, but is prevented from axial displacement.

Further details are disclosed in the other sublaims.

The details of the conveyor belt are evident from the following specification of an exemplary embodiment which is explained by referring to the drawing. In the Figures of the drawing:

FIG. 2 shows an individual link on enlarged scale;

FIG. 3 shows a side elevational view of the link according to FIG. 2;

FIG. 4 is a plan view of a supplementing or intermediate link;

FIG. 5 is a side elevational view of the linke according to FIG. 4 and

FIG. 6 shows an assembly of retainer pins formed as a chain, on enlarged scale.

Figure 1:
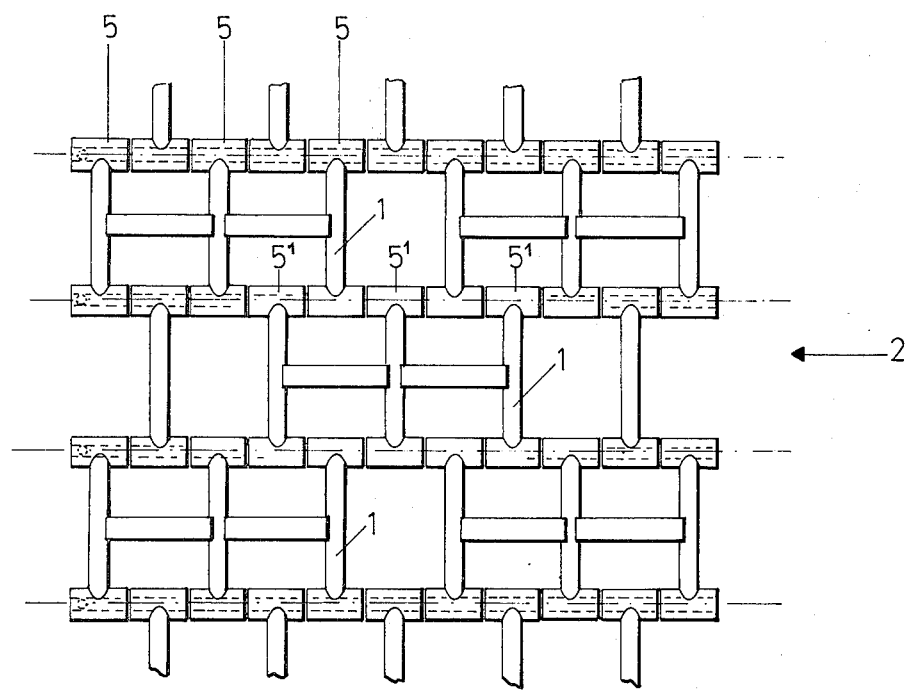
FIG. 1 shows a portion of a link conveyor belt in accordance with the invention.

According to FIG. 1, a plurality of links 1 are combined into a conveyor belt 2. The individual links consist of four legs 3, 4 arranged in double H configuration, as shown in FIG. 2. The free ends of the legs 3 are widened to form heads 5 such that the individual legs have a hammer-like appearance. As can be seen in the side elevational view (FIG. 3), the heads are of cylindrical cross-section and apertured axially (bore 6). The bores of The individual heads are aligned with each other in tandem. Further, the two outermost heads are provided with a second blind bore 7 extending transversely to the bore 6 and serving to receive a retainer pin, as explained in greater detail below.

In the assembling of the link conveyor belt, the heads 5, of another link are inserted into the open spaces intermediate the heads 5 of a link 1, whereby the spacings between the front sides of the heads are dimensioned such that the heads of said other link can be rotatably interposed with slight clearance. Preferably, the links of the belt hereby assume the position as shown in FIG. 1.

A plurality of links positioned in side-by-side relation are rotatably interconnected by means of an axle rod 8 inserted through the bores 6 of the heads 5. Preferably, such axle rod consists of steel wire. The rod is slightly shorter than the width of the conveyor belt. Upon insertion of the rod, the ends thereof are positioned between a pair of blind bores 7 of the outermost heads. A retainer pin 10 is driven into these bores 7 with a press fit, which pin comprises a thin and a thick shaft portion. Upon being driven in, this pin completely fills out the respective blind bore. As this retainer pin extends transversely of the bore 6 in front of the respective end of the axle rod, the latter is retained between a pair of retainer pins in such a manner that it is secured against axial movement so as to protect the individual, tied up links from being detached. However, rotation of the link relative to the rod 6 is possible.

In order to facilitate the assembling of the conveyor belt, the retainer pins are formed from plastic material in a rigid, chain-like configuration (FIG. 6) in which the pins are interconnected by thin webs 20 which can easily be sheared through. During assembling, the pins are held with their pin arrangement over the retainer blind bore 7 and then hammered into the latter. Hereby, the pin is sheared off from its web.

In order to complete the lateral edge boundaries of the conveyor belt, intermediate links as shown in FIG. 4 are provided, which intermediate links consist of a leg and a pair of heads which are fully identical to the legs and heads shown in FIGS. 2 and 3.

As a further alternative, it is proposed to provide the link extending in the center portion of the belt with a depending guide comb which, in the form of a short, keel-shaped protrusion, is guided between a pair of guide jaws so as to prevent lateral displacement of the web.

Plastic material is particularly useful as the material for the links of the conveyor belt. For special applications, belt links made from ceramic or metal may be used, too.

In the present arrangement and configuration of the links, it has been found that the conveyor belt, owing to the solid structure of the legs, is adapted to receive a surprisingly high tensile force which is sufficient for all purposes encountered.

What I claim is:

1. Link conveyor belt comprising a plurality of interconnected links each having legs in a double H configuration, said links providing a flat supporting surface, the free ends of said double edge links being longitudinally aligned and having transversely extending, aligned heads with transverse bores, adjacent heads defining a space into which the heads of another double H link are rotatably inserted, said double H links being positioned one behind the other in staggered relation with rod means inserted through the transverse bores of the heads of at least two staggered links.

2. Link conveyor belt of claim 1 wherein the transverse legs of the double H links have flat lower faces and a cross-sectional configuration which tapers upwardly towards a supporting surface.

3. Link conveyor belt of claim 1 wherein the rod means is shorter than the width of the conveyor belt and retainer pins extend transversely through the bores of each head positioned at the edge of the belt so as to prevent axial movement of the rod means.

4. Link conveyor belt of claim 3 wherein the heads positioned at the edge of the conveyor belt have blind bores for the retainer pins which open only to one side of the head.

5. An assembly of retainer pins for assemblying the link conveyor belt of claim 3 comprising a chain formed by retainer pins which are interconnected by means of thin, readily shearable webs.

* * * * *